L. WATKINS.
TRAILER.
APPLICATION FILED AUG. 4, 1917.

1,276,598.

Patented Aug. 20, 1918.
2 SHEETS—SHEET 1.

WITNESSES
Frederick Diehl.
A. L. Kitchin.

INVENTOR
Leigh Watkins
BY Munn & Co
ATTORNEYS

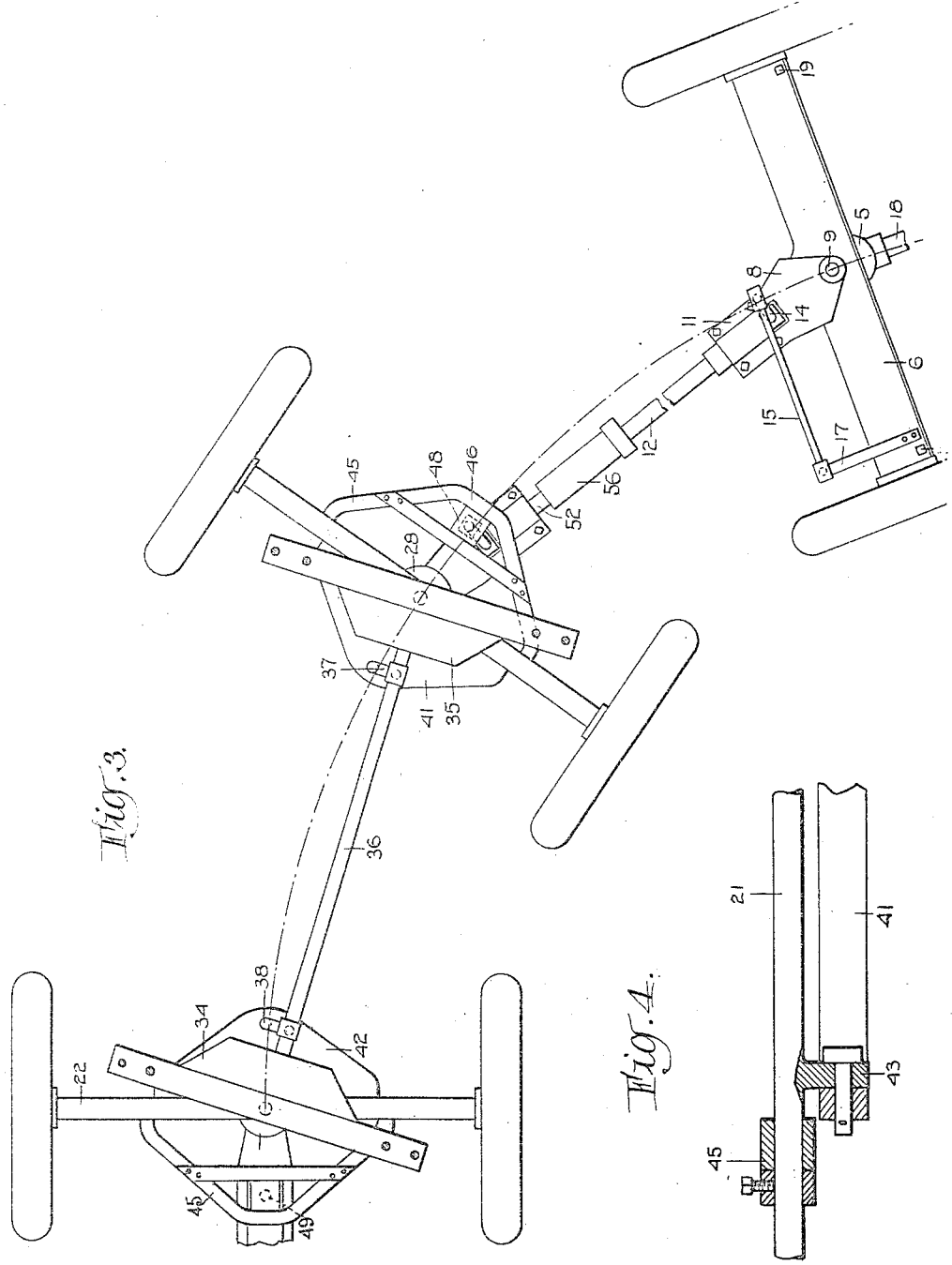

though Fig. 2 approximately on line 4—4.
UNITED STATES PATENT OFFICE.

LEIGH WATKINS, OF EL PASO, TEXAS.

TRAILER.

1,276,593.　　　Specification of Letters Patent.　　Patented Aug. 20, 1918.

Application filed August 4, 1917.　Serial No. 184,410.

*To all whom it may concern:*

Be it known that I, LEIGH WATKINS, a citizen of the United States, and a resident of El Paso, in the county of El Paso and State of Texas, have invented a new and Improved Trailer, of which the following is a full, clear, and exact description.

This invention relates to an improved construction and arrangement of trailers, and has for an object the provision of improved means which will allow an easy turning movement where a number of trailers are connected while admitting of strain between the various trailers whereby they are properly propelled around a curve.

Another object in view is to provide an improved construction wherein both axles of the tractor are held in position by a king pin and parts are connected with the axle and with the draft member for turning the axle in different directions when turning a corner so as to cause the wheels to properly follow or track.

A still further object of the invention is to provide a trailer with an inclosing casing and connecting members arranged in connection therewith designed to inclose the rear axle of the automobile so that the trailer may be connected to the automobile without change either in the tractor or the automobile.

In the accompanying drawings:—

Fig. 3 is a diagram showing how the wheels of the tractor follow when turning a corner.

Fig. 4 is a detail perspective sectional view through Fig. 2 approximately on line 4—4.

Figure 1:
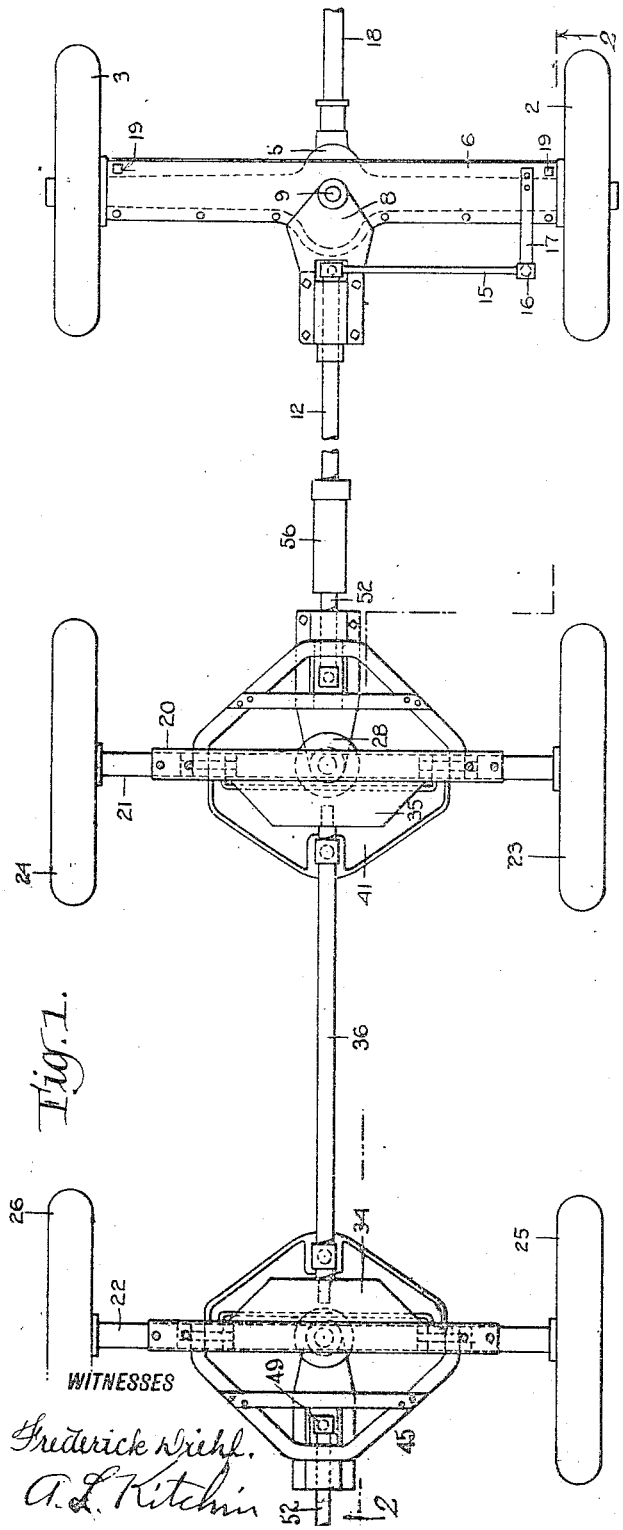
Figure 1 is a top plan view of a tractor in the rear of an automobile with the top of the tractor removed.

Referring to the accompanying drawings by numerals, 1 indicates the rear axle of an automobile to which the wheels 2 and 3 may be connected in any suitable manner, axle 1 being surrounded by a casing 4 which is provided with an enlargement 5 for receiving the driving gears and other associated mechanism. A substantially U-shaped casing 6 is provided which surrounds the casing 4, said U-shaped casing merging into an enlargement 7 to which is pivotally connected a hood 8 by suitable pivotal pins 9 and 10. The hood 8 merges into a tubular member 11 into which extends the shaft 12, said shaft having rigidly secured thereto the head 13 of the rod 14. The upper end of rod 14 is preferably formed into a bolt and fits into a suitable socket formed in the end of a link 15, said link in turn having a socket for receiving the bolt 16 arranged on the end of the bracket 17. By providing the head 13 as described rotary movement is conveyed to shaft 12 and also a longitudinal movement when the tractor 18 moves. In connection with the U-shaped casing 6 it will be noted that a plurality of pins 19 are provided, said pins extending through the casing, as shown in Fig. 2, so as to lock the casing 6 to the casing 4 surrounding the axle 1, whereby the tractor 18 may be readily connected to the trailer or readily disconnected.

The trailer 20 is provided with axles 21 and 22 of any suitable type, carrying wheels 23, 24, 25 and 26. Turn tables 27 and 28 are provided for the axles 21 and 22 and king pins 29 and 30 are used for connecting the supports 31 and 32 to the respective axles, said supports in turn being provided with a platform 33, as shown in Fig. 2. Brackets 34 and 35 are secured to the supports 31 and 32, said brackets having sockets in which the shaft 36 is journaled, as shown in Fig. 2, said shaft carrying depending bars 37 and 38 loosely fitting into sockets 39 and 40, said sockets 39 and 40 permitting a proper movement of the lower end of the bars, as shown in Fig. 3, when turning. Preferably the lower end of these bars is rounded in order to provide a better bearing surface at the different angles. The sockets 39 and 40 are provided in the turning plates 41 and 42, said turning plates being pivotally connected to suitable depending brackets 43 and 44 on the axles 21 and 22. By this construction and arrangement, when the shaft 36 rocks in one direction power will be transmitted to the axles for turning the same in opposite directions, as shown in Fig. 3, thus causing the wheels thereof to follow or track in passing around a corner.

Figure 2:
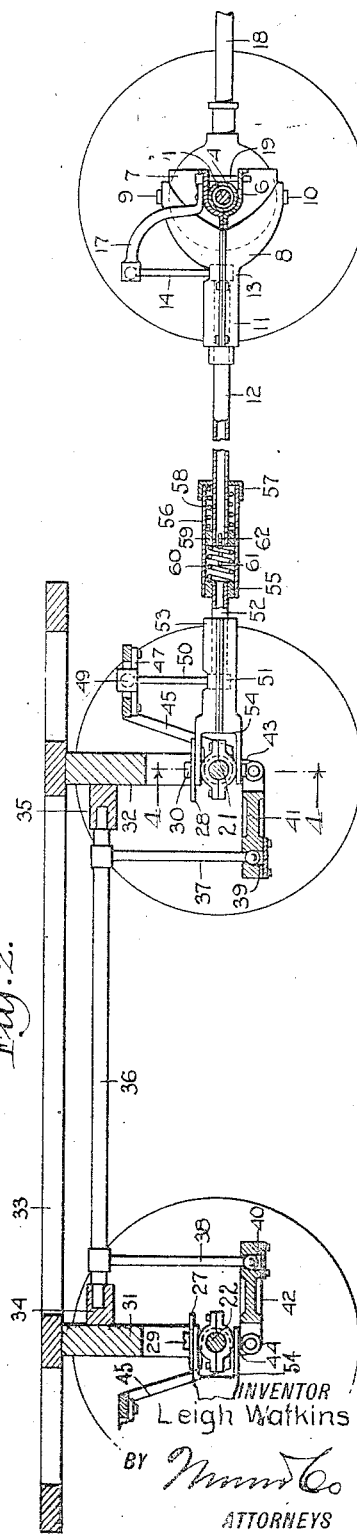
Fig. 2 is a longitudinal vertical section through Fig. 1 on line 2—2.

In order that the front axle will receive power for turning in a horizontal plane from the tractor 18 it is provided with a yoke 45 which extends upwardly, as shown in Fig. 2, and is formed with a horizontal portion 46 to which a plate 47 is secured. The plate 47 is provided with a socket member 48 in which the rounded end 49 of bar 50 is loosely positioned and is allowed a sufficient back and forth movement to permit the turning, as shown in Fig. 3. The bar 50 at the lower end is provided with an enlargement 51 rigidly secured to the shaft 52 provided in the fitting 53. The fitting 53 is bifurcated at 54, with the forks extending above and below the axle so that the king pin 30 may extend through the turn table 28 and the forks of the fitting as well as the axle 21. By this connection the longitudinal strain or pull on the shaft 52 is communicated to the axle 21 and from thence to the remaining part of the trailer, whereby the trailer is moved along with the tractor 18.

Shaft 52 at its front end is provided with an enlargement 55, which enlargement is secured to sleeve 56, said sleeve having a closed end 57 for holding the spring 58 in position, which spring acts against an enlargement 59 of shaft 12. A spring 60 acts against the enlargement 59 and against the enlargement 55 whereby the movement of shaft 52 is cushioned but is transmitted to shaft 52 when said movement is carried to an appreciable extent, as for instance, when the tractor is pulling the trailer. A slot 61 is provided in sleeve 56, said slot accommodating the pin 62 which passes through part of shaft 12 and said slot. This structure is necessary in order that the turning or rocking movement of shaft 12 will be communicated to shaft 52 in order that bar 50 may be swung and movement thereby be communicated to axle 51 and other connected parts for turning the same, as shown in Fig. 3, when the device is passing around a corner.

What I claim is:

1. A trailer of the character described comprising a body, a pair of axles, a pivotal connection arranged centrally on the axles for connecting the axles pivotally with the body, a front and rear yoke extending from each of said axles, draft means connected with said front axle, a swinging arm engaging the front yoke of the front axle, a rock shaft connected with said swinging arm for swinging the same and thereby moving said yoke and the axle connected therewith, a rock shaft pivotally supported near said body, a swinging arm connected to said rock shaft near each end, said swinging arms being connected at the lower end to the rear yoke of the front axle and the front yoke of the rear axle, and means connected with said draft member and with said power shaft for moving the trailer and for rocking the draft shaft when turning a corner whereby the axles on the trailer will be turned for causing the wheels carried thereby to follow the wheels of said means.

2. In a device of the character described, a trailer, and means for connecting the trailer to a tractor, said means including a substantially U-shaped casing fitting over the rear axle of the tractor and extending substantially the full length thereof for preventing wabbling and movement longitudinally of the axle, pins extending through said casing and locking the casing to said axle, and a draft member pivotally connected with the casing and with the trailer.

3. In a device of the character described, a trailer provided with means for shifting the axle, so that the rear wheels will follow in the track of the front wheels, a draft member connected with the trailer, said draft member being formed with a shaft having a cushion member interposed therein, said cushion member being provided with oppositely arranged springs for cushioning a pressure in two directions, means for connecting the parts of the draft member together so as to allow the same to slide while causing the same to rotate simultaneously, means for connecting said draft member with the front axle of said trailer for shifting the same, means for connecting the draft member with a tractor, and means connected with the tractor for rotating said draft member.

LEIGH WATKINS.